United States Patent [19]

Brown

[11] 4,079,436
[45] Mar. 14, 1978

[54] 5,000 HOUR BLOCKING OSCILLATOR FOR AN ELECTROMAGNETIC FUEL PUMP

[75] Inventor: Ralph V. Brown, Cayuta, N.Y.

[73] Assignee: Facet Enterprises, Inc., Tulsa, Okla.

[21] Appl. No.: 700,353

[22] Filed: Jun. 28, 1976

[51] Int. Cl.² .................. H02H 7/20; H02H 3/20
[52] U.S. Cl. ...................... 361/91; 361/56
[58] Field of Search ............ 317/31, 33 R, 33 SC, 317/33 VR; 331/62, 116 M, 148; 318/128, 130; 361/91, 88, 56, 86, 110, 111

[56] References Cited

U.S. PATENT DOCUMENTS

| | | | |
|---|---|---|---|
| 3,048,718 | 8/1962 | Starzec et al. | 361/91 |
| 3,303,386 | 2/1967 | Murphy | 361/91 |
| 3,331,033 | 7/1967 | Johnston | 331/62 X |
| 3,593,200 | 7/1971 | Reich | 331/116 M |
| 3,629,674 | 12/1971 | Brown | 318/128 |
| 3,654,757 | 4/1972 | Takamune | 331/116 M X |
| 3,699,415 | 10/1972 | Inoue et al. | 318/128 |
| 3,787,783 | 1/1974 | Ketterer | 331/116 M |
| 3,931,546 | 1/1976 | Jakobs et al. | 317/31 X |
| 3,934,158 | 1/1976 | Shinozaki | 317/31 X |
| 3,970,900 | 7/1976 | Hodgins | 317/31 |

*Primary Examiner*—J D Miller
*Assistant Examiner*—Patrick R. Salce
*Attorney, Agent, or Firm*—Remy J. VanOphem

[57] ABSTRACT

An electromagnetic fuel pump embodying a blocking oscillator relatively insensitive to breakdown under overvoltage conditions is disclosed. The blocking oscillator embodies an overvoltage protection circuit which renders the amplifier in the blocking oscillator portion of the circuit nonconductive during any overvoltage conditions. As a result, the Darlington amplifier only has to withstand the overvoltage and the probability of current mode failure is significantly reduced. A filter circuit surpresses the generated RFI to levels below industrial and military standards.

10 Claims, 4 Drawing Figures

4,079,436

5,000 HOUR BLOCKING OSCILLATOR FOR AN ELECTROMAGNETIC FUEL PUMP

BACKGROUND OF THE INVENTION

1. Field of the Invention

The present invention relates to blocking oscillators adapted for switching inductive loads and, more particularly, to a blocking oscillator that is resistant to transient voltage fluctuations.

2. Description of the Prior Art

Electromagnetic fluid pumps are used for a wide variety of applications including supplying fuel to internal combustion engines. As a result, they are required to operate over a wide range of ambient temperatures and endure relatively large voltage fluctuations. They are normally powered by the same electrical source providing electrical power to the engine and its accessories such as the ignition system, starter, and various other inductive devices. Operation of the starter, for instance, requires a large current which results in a substantial decrease in the output voltage of the electrical power source. Conversely, when the power to the starter is terminated, the energy stored in the starter windings is released (inductive kickback) which will cause a negative voltage transient in the electrical system beyond the nominal voltage level of the electrical power source. Another factor to be considered is load dumping in which a low impedance load is turned off or disconnected. This results in a temporary overvoltage condition which could also cause a failure of the circuit. Likewise, radio, ignition system and other devices connected to the electrical system of an internal combustion engine are sensitive to Radio Frequency Interference (RFI). Normally, filter devices such as diodes and R.C. networks are provided to surpress RF interference and prevent them from being adversely effected by the RFI interference generated by the other devices connected to the electrical system. However, these filter devices are not always totally effective and are also subject to failure, therefore, any electrical device connected to the electrical system should not be a source of RF interference. The primary factors to be considered are operation under low voltage input conditions, component failure under overvoltage conditions, and the generation of RFI. While most solid state devices can survive relative high overvoltage conditions in their nonconducting state, they are highly susceptible to damage if the overvoltage occurs while they are in the conductive state. These are commonly referred to as "current mode failures". Disclosed herein is an improved blocking oscillator circuit of the type generally disclosed in my prior U.S. Pat. No. 3,629,674 (December, 1971) and the H. P. Wertheimer, et al, U.S. Pat. No. 3,381,616 (May, 1968), which is an improvement thereon, and has a much higher tolerance to the voltage fluctuations than ever realized heretofore.

SUMMARY OF THE INVENTION

The present invention contemplates an electromagnetic fluid pump having a solenoid coil driving a reciprocating member of a fluid pump. An amplifier is connected in series with the solenoid coil to control the current flow therethrough. A detection coil magnetically coupled to the solenoid provides a "turn on" bias to the amplifier when the current in the solenoid coil is increasing and a "turn off" bias to the amplifier when the current in the solenoid coil is decreasing. As a result, the amplifier is cyclically driven to saturation, then turns off.

A series connected diode and current limiting resistance connected across the terminals of the solenoid coil are provided to dissipate the energy of the collapsing magnetic field of the solenoid coil when the amplifier is turned off. This series connected diode and current limiting resistance provides a controlled discharge of the stored energy so that the induced voltage is significantly reduced. A voltage dropping resistance is connected between one end of the detection coil and the junction between the solenoid coil and the amplifier. The opposite end of the detection coil is connected to the base input of the amplifier and to a negative or ground potential through a base biasing resistance. The series connected voltage dropping resistance, detection coil and base biasing resistance form a voltage divider network providing a "turn on" potential at the base of the amplifier over an increased range of ambient temperatures and an increased range of voltage fluctuations. A base voltage limiting Zener diode is connected in parallel with the base biasing resistance and limits the maximum voltage that can occur at the base input of the amplifier. The base of the amplifier is also connected by means of a control diode to an overvoltage protection circuit comprising a control transistor and a control Zener diode. The control Zener diode is connected between the base of the control transistor and the negative or ground potential. The emitter of the control transistor is connected to the input voltage source and the collector is connected to the base input of the amplifier through the control diode. When the input voltage on the input line exceeds the breakover potential of the control Zener diode, the control Zener diode starts to conduct and the control transistor turns on, back biasing the base input to the amplifier and turns the amplifier off. Because the amplifier is turned off each time an overvoltage condition occurs, the circuit needs only to endure the high line voltage and not the associated high currents. In the preferred embodiment of the circuit, the amplifier is a Darlington amplifier.

One object of the invention is to provide a switching circuit for an electromagnetic device that is resistant to transient voltages.

Another object of the invention is to provide a switching circuit for an electromagnetic device that is less expensive than circuits heretofore provided.

Another object of the invention is to provide a switching circuit for an electromagnetic device that will start at cold temperatures and low voltage conditions.

Another object of the invention is to provide an overvoltage protection circuit for the switching circuit, which turns the Darlington amplifier off under high voltage conditions.

Another objective of the invention is a blocking oscillator circuit for an electromagnetic fuel pump 90% of which can survive 5,000 hours of operation in ordinary use.

The foregoing and other objectives and advantages of the present invention will appear more fully hereinafter from consideration of the detailed description which follows, taken together with the accompanying drawings of the invention.

DESCRIPTION OF THE PREFERRED EMBODIMENT

Figure 1:
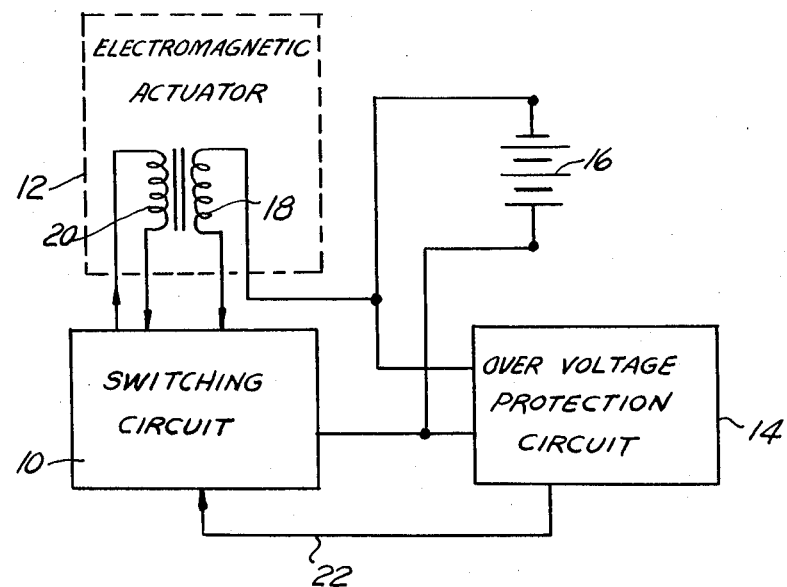
Referring to FIG. 1, there is shown a block diagram illustrating the interrelationship of a switching circuit 10 with an electromagnetic actuator 12 and an overvoltage protection circuit 14.

Referring to FIG. 1, there is shown a block diagram illustrating the interrelationship of a switching circuit 10 with an electromagnetic actuator 12 and an overvoltage protection circuit 14. The switching circuit 10 is powered by a source of electrical power, illustrated as a D.C. battery 16 producing output D.C. voltages V+ and V− at the opposite terminal as indicated. It is recognized that the source of D.C. electrical power may be a generator, alternator or any other type of electrical power source normally associated with internal combustion or other types of engines. The switching circuit 10 controls the current flow through a solenoid coil 18 in the electromagnetic actuator 12, generating a magnetic field which is operative to produce a desired mechanical motion. The field generated by the solenoid coil 18 is detected by a detection coil 20 which generates a feedback signal controlling the cyclic operation of the switching circuit 10. The overvoltage protection circuit 14 monitors the input voltages to the switching circuit 10 and generates an output signal on line 22 which turns "off" the switching circuit 10, thereby making it inoperative during the duration of an overvoltage condition. The details of the switching circuit 10 and overvoltage protection circuits 14 will be discussed in detail with respect to the circuit diagram of FIG. 4 driving an electromagnetically actuated fluid pump as illustrated in FIGS. 2 and 3.

Figure 2:
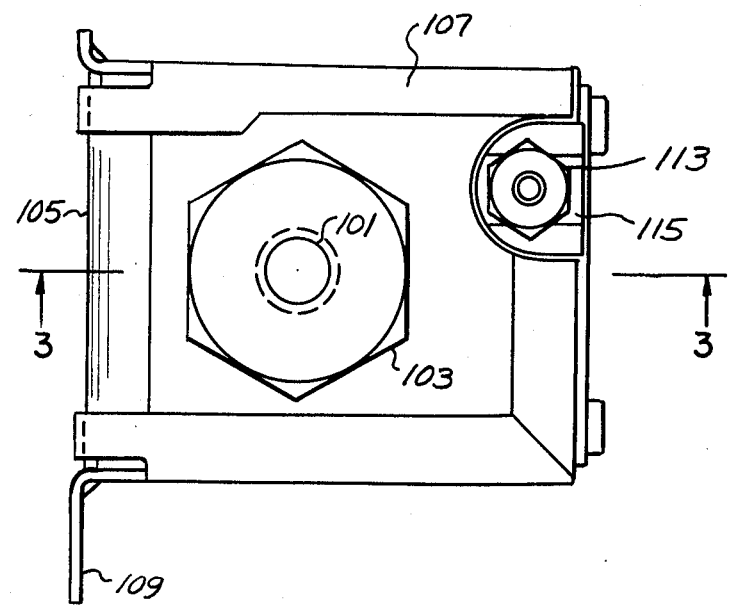
Referring to FIG. 2, there is shown an end view of a typical electromagnetic fluid pump incorporating the invention.

Referring to FIG. 2, there is shown an end view of a typical electromagnetic fluid pump incorporating the invention. The invention can also be adapted to other styles of pumps, i.e., cylindrical pumps as shown in U.S. Pat. No. 3,381,616, owned by assignee hereof. The electromagnetic fluid pump shown in FIG. 2 has a threaded outlet 101 formed in a first hexagonal-shaped member 103 which is threaded into one side of a U-shaped member 105. A mounting bracket and a cover member 107 slides over member 105 to form an enclosed housing. Cover member 107 has flanged portions 109 with holes formed therein for mounting the pump to a surface. A terminal assembly 113 is mounted on the U-shaped member 105 but insulated therefrom by an insulation member 115 so as to be electrically isolated from members 105 and 107.

Figure 3:
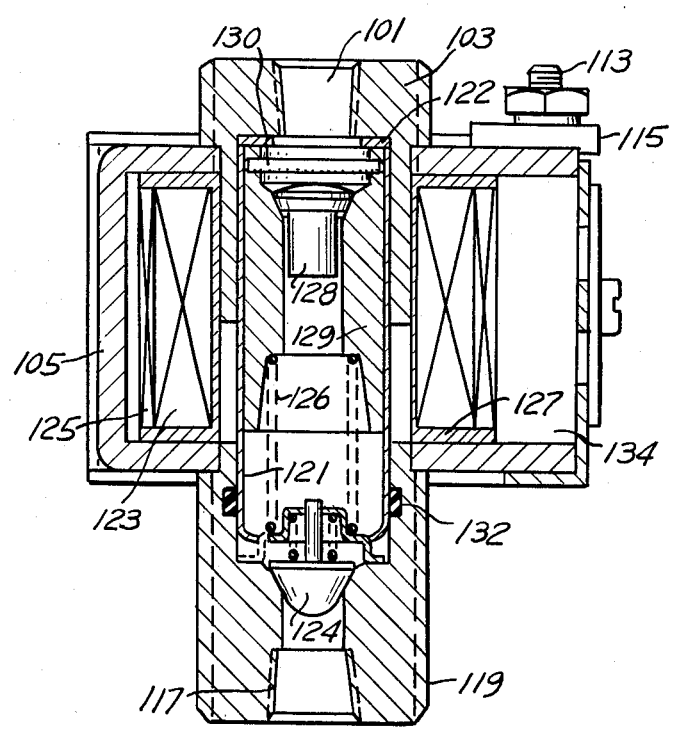
Referring to FIG. 3, the pump is shown in cross section.

Referring to FIG. 3, the pump is shown in cross section. A threaded inlet 117 is formed in a second hexagonal-shaped member 119 which is threaded into another side of the U-shaped member 105 so that an inlet 117 is in alignment with an outlet 101. A hollow cylindrical guide member 121 is supported by a cylindrical extension of the first hexagonal-shaped member 103 and is maintained in axial alignment with the inlet 117 and the outlet 101. Disposed between the sides of the U-shaped member 105 and coaxially with the guide member 121 are a solenoid winding 123 and a detection coil winding 125. The solenoid is formed of a relatively high number of turns of wire so that it has a relatively high resistance and inductance. A thin layer of non-magnetic material in the form of a spool 127 separates the windings 123 and 125 from the cylindrical extension of the first hexagonal-shaped member 103 and the sides of the U-shaped member 105. A movable armature in the form of a reciprocating plunger 129, made of a magnetic material and having an opening therethrough, is slideably mounted within the guide member 121. A resilient ring 122 is disposed in coaxial alignment with the guide member 121 in a recess of the first hexagonal member 103 and is retained therein by the guide member 121. A check valve 124 is mounted in the inlet 117 of the second hexagonal-shaped member 119 to prevent fluid flow other than an unidirectional fluid flow from the inlet to the outlet through the cylindrical guide member 121. A resilient member illustrated as a spring 126 is compressively confined between the plunger 129 and a check valve 124 to urge the plunger 129 toward the outlet 101 and against the resilient ring 122. A check valve 128 is disposed within the opening through the plunger 129 for allowing fluid to flow through the plunger 129 only in the direction from the inlet 117 to the outlet 101. A retaining means 130 is mounted within the plunger 129 to prevent the check valve 128 from being dislodged. The second hexagonal shaped member 119 has a recess formed in coaxial alignment with the inlet 117 for receiving a portion of the guide member 121, said recess has a circular groove formed therein for receiving an O-ring which provides a seal between members 119 and 121. The electronic circuitry is contained within a space 134.

Figure 4:
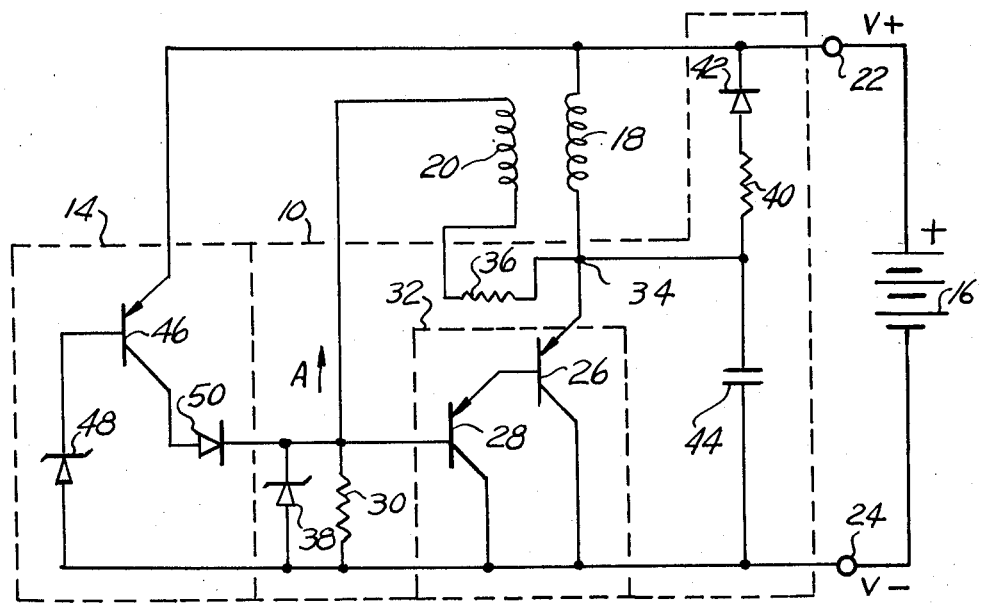
Referring to FIG. 4, there is shown a schematic diagram of the switching circuit 10 and the overvoltage protection circuit 14.

Referring to FIG. 4, there is shown a schematic diagram of the switching circuit 10 and the overvoltage protection circuit 14. Positive electrical power V+ from the source of electrical power, such as a battery 16, is received at a positive input terminal 22 which is the same as a terminal assembly 113 shown on FIG. 2, and the negative electrical power is received at a negative input terminal 24 which is the same as a bracket 109. One end of a solenoid coil 18 is connected to the positive input terminal 22 and the opposite end of the solenoid coil 18 is connected to the emitter of a first transistor 26, and the collector of the transistor 26 is connected to the negative input terminal 24. The base of the first transistor 26 is connected to the emitter of a second transistor 28. The collector of the second transistor 28 is connected to the negative input terminal 24 and the base of the second transistor 28 is also connected to the terminal 24 through a base biasing resistance 30. The combination of the first and second transistors 26 and 28 form a high gain amplifier 32 capable of controlling large current flows with relatively small control currents in the base circuit of the second transistor 28. In the preferred embodiment, the high gain amplifier 32 is a Darlington amplifier as shown. However, amplifier 32 may be a single high gain transistor as known in the art. The base of the second transistor 28 is connected to a junction 34 between the solenoid coil 18 and the second transistor 26 through the detection coil 20 and a voltage dropping resistance 36. The series combination of voltage dropping resistance 36, the detection coil 20 and the base biasing resistance 30 form a voltage divider network providing a potential at the base of the second transistor 28 which is intermediate the potential applied across the positive and negative input terminals 22 and 24, and assures the amplifier 32 will be in the conductive state for any potential applied at Junction 34 which is more positive than the potential applied to negative input terminal 24.

The circuit, as described to this point constitutes a blocking oscillator in which the current induced in the detection coil 20 by the current flow in the solenoid coil 18 cyclically drives the amplifier 32 between the full conductive and nonconductive state.

A base voltage limiting Zener diode 38 is also connected from the base of the second transistor 28 to the negative input terminal 24 to limit the maximum potential applied between the base and the collector of the second transistor 28 and provides a low impedance path for generated radio frequency interference (RFI) signals. A series connected current limiting resistance 40 and a diode 42 are connected between a junction 34 and the positive input terminal 22 in parallel circuit relationship with the solenoid coil 18 to provide a controlled low resistance path for the current induced in the solenoid coil 18 by the collapsing magnetic field when the amplifier 32 is turned "off" and is in nonconducting state. A capacitance 44 is connected from the junction 34 to the negative input terminal 24. The series combination of the solenoid coil 18 in series with the capacitance 44 further serves to surpress the RFI generated by the switching circuit 10.

The emitter of a control transistor 46 in the overvoltage protection circuit 14 is connected to the positive input terminal 22. The base of control transistor 46 is connected to the negative input terminal 24 through a control Zener diode 48 having a cross over potential higher than the maximum nominal potential of the source of electrical power and lower than a potential which would cause excessive and damaging currents in the amplifier 32 in its most conductive state. The collector of control transistor 46 is connected to the base of the second transistor 28 through a forward biased control diode 50.

The operation of the circuit is as follows:

Applying a potential from the source of electrical power 16 across the positive input terminal 22 and negative input terminal 24 initiates a current flow from the positive input terminal 22 through the solenoid coil 18 to junction 34 then through voltage dropping resistance 36, the detection coil 20 and base biasing resistance 30 to the negative input terminal 24. As a result of this current flow, the potential at the base of the second transistor 28 is lower than the potential at the emitter of transistor 28 and the transistor 28 starts to conduct. Conductance of the second transistor 28 permits a base current flow in the first transistor 26 which now also starts to conduct increasing the current flow through the solenoid coil 18. The increasing current flow in the solenoid coil 18 induces a current in the detection coil 20 which flows in a direction of arrow A which increases the base current of the second transistor 28. The increased base current increases the conductance of the second transistor 28 and likewise the conductance of the first transistor 26. This process continues until the amplifier 32 is fully conductive. When the amplifier 32 becomes fully conductive, the current flow through the solenoid coil 18 becomes a constant and the magnetic field generated by the solenoid coil 18 ceases to increase. This terminates the current induced in the detection coil 20 and causes a decrease in the base current of the second transistor 28. A decrease in the base current of the second transistor 28 decreases the conductance of transistor 28, which decreases the conductance of the first transistor 26. A decrease in the conductance of the first transistor 26 decreases the current flow through the solenoid coil 18 causing the generated magnetic field to start to collapse. The collapsing magnetic field induces a current flow in the detection coil 20 which flow is now in the reverse direction to arrow A and further diminishes the current flow in the base circuit of the second transistor 28, and likewise, the base current of the first transistor 26. This process continues until the amplifier 32 becomes nonconductive which is the initial state of the circuit. The process then cyclically repeats itself.

The current flowing through coil 18 and the amplifier 32 just prior to the collapse of the magnetic field, will by virtue of magnetic inertia, flow through the series combination of the current limiting resistance 40, and the diode 42. This current, initially equal to the current flowing through the coil 18, decreases exponentially as the magnetic field collapses.

RFI signals which are generated in the circuit are filtered by the series combination of the solenoid coil 18 and the capacitance 44. Residual RFI signals which are generated at the junction 34 and not surpressed by the filter comprising the solenoid coil 18 and the capacitance 44 are shunted across the base biasing resistance 30 in the base circuit of the second transistor 28 by a base voltage limiting Zener diode 38. The effect of the base voltage limiting Zener diode 38 is to effectively clamp the maximum potential between the base and collector of the second transistor 28 to a potential less than the maximum rated potential that may safely be applied across them.

The potential occurring at the positive input terminal 22 is also applied to the emitter of the control transistor 46 which has its base connected to the negative terminal 24 through the control Zener diode 48. As indicated before, the cross over potential of the control Zener diode 48 is less than the maximum parallel which the amplifier 32 withstands in the fully conductive state without damage (current mode failure), but higher than the maximum nominal potential produced by the source of electrical power 16. For all potentials below the cross over potential of the control Zener diode 48, the control Zener diode is nonconductive and no current can flow in the base circuit of the control transistor 46. However, when an overvoltage condition occurs which is higher than the cross over potential of the control Zener diode 48, the control Zener diode becomes fully conductive and provides a low resistance path for the base current of the control transistor 46 to the negative input terminal 24. This causes the control transistor 46 to conduct providing a current flow through the control diode 50 and the base biasing resistance 30 to the negative input terminal 24. The increased flow through the base biasing resistance 30 increases the potential applied to the base of the second transistor 28 to the crossover potential of the control Zener diode 48 effectively back biasing the second transistor 28 and the amplifier 32. The current flow from the third control transistor 46 is counter to the base current of the second transistor 28 terminating the current flowing in the base circuit of the first transistor 26 making the second transistor 28 and the amplifier 32 only nominally conductive. By the action of the overvoltage protection circuit 14, the amplifier is effectively turned "off" during an overvoltage condition and the switching circuit 10 is subjected to only overvoltage breakdown and does not have to survive the high currents attendant steady overvoltage conditions. Since the predominant mode of failure of solid state devices is the current mode failure, the disclosed circuit is significantly less subject to failure due to high energy pulses or steady overvoltage conditions than the circuits of the prior art.

While the invention has been illustrated and described with reference to a blocking oscillator circuit and a particular electromagnetic fluid pump, the selected circuits and pump configuration are only used for illustrative purposes and the invention is not to be limited in scope to these specific elements.

I claim:

1. In combination with an electromagnetic actuator powered by a source of electrical power wherein said electromagnetic actuator has an armature movable in response to a magnetic field, a solenoid coil having an input end and an output end for generating a magnetic field in response to a current flow therethrough, a detection coil having one end connected to the output end of the solenoid coil, responsive to the magnetic field generated by the solenoid coil for generating a control signal, and wherein the source of electrical power has a first terminal connected to the input end of the solenoid coil and a second terminal; a circuit for generating an intermittent current flow through the solenoid coil comprising:

amplifier means having an input connected to the output end of the solenoid coil, an output connected to the second terminal of the source of electrical power, and a control electrode connected to the other end of the detection coil and receiving the control signal;

a transistor having an emitter connected to the input end of the solenoid coil, a collector and a base;

a first zener diode having an anode connected to the output electrode of said amplifier means, and a cathode connected directly to the base of said transistor; and a diode having an anode connected to the collector of said transistor and a cathode connected to the control electrode of said amplifier means.

2. The combination of claim 1 further including a resistance connected between the output end of the solenoid coil and the one end of the detection coil.

3. The combination of claim 2 further including a second zener diode having an anode connected to the output of said amplifier means and a cathode connected to said control electrode to limit the maximum potential that may be applied between said control electrode and said output.

4. The combination of claim 3 wherein said amplifier means comprises:

a Darlington amplifier having an input, an output and a control electrode; and a bias resistance connected between said control electrode and said output.

5. The combination of claim 3 wherein said circuit further includes a serially connected diode and current limiting resistance connected in parallel with the solenoid coil to provide a low resistance path for the current induced by the collapsing of the magnetic field when said amplifier is turned in response to the control signal; and a capacitance connected between the output end of the solenoid coil and the output of said amplifier means to form, in combination with the solenoid coil, an RFI filter.

6. The combination of claim 3 wherein the electromagnetic actuator is an electromechanical pump wherein the armature is a biased piston, said pump further including valve means for providing a unidirectional fluid flow through the pump with the movement of the piston.

7. An electromagnetic fluid pump comprising:

a housing having an input port, an outlet port and a cylindrical internal passageway connecting said input port and said outlet port;

a biased piston disposed in said cylindrical passageway movable in response to a magnetic field;

valve means for providing a unidirectional fluid flow from said input port to said outlet port;

a positive and a negative electrical terminal;

a solenoid coil for generating said magnetic field, said solenoid coil having one end connected to said positive terminal and another end;

a detection coil for generating an induced current, said detection coil having a first end connected to the other end of said solenoid coil, and a second end;

amplifier means having an input connected to the other end of said solenoid coil, an output connected to said negative terminal and a control electrode connected to the second end of the solenoid coil;

a transistor having an emitter connected to said positive terminal, a collector, and a base;

a first zener diode having a cathode connected directly to the base of said transistor and an anode connected to said negative terminal, and;

a diode having an anode connected to the collector of said transistor and a cathode connected to the control electrode of said amplifier means.

8. The pump of claim 7 further including a resistance connected between the other end of the solenoid coil and the first end of the detection coil and a zener diode having a cathode connected to the control electrode of said amplifier means and an anode connected to said negative terminal.

9. The pump of claim 8 wherein said amplifier means comprises:

a Darlington amplifier having an emitter terminal connected to the other end of the solenoid coil, a collector terminal connected to said negative terminal, and a base terminal connected to the second end of the detection coil; and a resistance connected between said base terminal and said collector terminal.

10. The pump of claim 8 further including a serially connected diode and current limiting resistance connected in parallel with said solenoid coil to provide a low resistance path for the current induced in the solenoid coil by the collapsing of the magnetic field when said amplifier is turned off in response to the signal induced in the detection coil; and a capacitance connected between the other end of the solenoid coil and said negative terminal to form an RFI filter in combination of said solenoid coil.

* * * * *

UNITED STATES PATENT OFFICE
CERTIFICATE OF CORRECTION

Patent No. 4,079,436  Dated  March 14, 1978

Inventor(s) Ralph V. Brown

It is certified that error appears in the above-identified patent and that said Letters Patent are hereby corrected as shown below:

Column 3, line 44, after the word "pumps" second occurence, insert the word ----such----.

Column 6, line 36, delete the word "parallel" and insert the word ----potential----.

Column 6, line 52, after the word "increased" insert the word ----current----.

Signed and Sealed this

Fifth Day of September 1978

[SEAL]

Attest:

RUTH C. MASON
Attesting Officer

DONALD W. BANNER
Commissioner of Patents and Trademarks